US010683172B2

(12) United States Patent
Anders et al.

(10) Patent No.: US 10,683,172 B2
(45) Date of Patent: Jun. 16, 2020

(54) UNDERGROUND STORAGE SYSTEM WITH GRAVITATIONAL AND BUOYANCY FORCE-BASED PACKAGE DELIVERY

(71) Applicant: International Business Machines Corporation, Armonk, NY (US)

(72) Inventors: Kelley Anders, East New Market, MD (US); Gregory J. Boss, Saginaw, MI (US); Sarbajit K. Rakshit, Kolkata (IN); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 16/046,734

(22) Filed: Jul. 26, 2018

(65) Prior Publication Data

US 2020/0031579 A1    Jan. 30, 2020

(51) Int. Cl.
*B65G 1/137* (2006.01)
*B65G 11/06* (2006.01)
(Continued)

(52) U.S. Cl.
CPC .............. *B65G 1/1376* (2013.01); *B63C 7/10* (2013.01); *B65G 1/08* (2013.01); *B65G 11/063* (2013.01); *B65G 67/24* (2013.01); *G06Q 7/10376* (2013.01); *G06K 19/07758* (2013.01); *G06Q 10/047* (2013.01); *G06Q 10/0832* (2013.01); *B65G 2201/0235* (2013.01); *B65G 2812/086* (2013.01); *B65G 2814/0316* (2013.01); *B65G 2814/0382* (2013.01)

(58) Field of Classification Search
CPC .... B65G 2812/086; B65G 11/063; B63C 7/10
See application file for complete search history.

(56) References Cited

U.S. PATENT DOCUMENTS 3,667,591 A * 6/1972 Sykes .................. B65G 11/063
                                                           198/756
4,628,827 A    12/1986 Litter
(Continued)

OTHER PUBLICATIONS

"Buoyancy", retrieved from http://www.hp-gramatke.net/pmm_physics/english/page0550.htm; May 2004.

*Primary Examiner* — Thomas Randazzo
(74) *Attorney, Agent, or Firm* — Brown & Michaels, PC; Jay Wahlquist

(57) ABSTRACT

A system for dispensing packages from an underground storage facility is disclosed, more specifically to disclose systems for handling packages using gravity and buoyancy. An underground storage system comprises a storage facility and at least one open air fluid column. The storage facility has an above ground portion connected to a hollow underground portion with a bottom. A helical ramp extends from the above ground portion to the bottom of the storage facility. Devices are located adjacent to the helical ramp to dispense packages to the helical ramp. A conveyor is located at the bottom of the underground portion to receive packages from the helical ramp. An airlock is located adjacent to the bottom of the underground portion and is connected to a conveyor. Packages are discharged from the storage facility via the airlock.

20 Claims, 4 Drawing Sheets

(51) Int. Cl.
*B63C 7/10* (2006.01)
*B65G 1/08* (2006.01)
*G06Q 10/08* (2012.01)
*G06K 7/10* (2006.01)
*G06K 19/077* (2006.01)
*G06Q 10/04* (2012.01)
*B65G 67/24* (2006.01)

(56) References Cited

U.S. PATENT DOCUMENTS

| | | | | |
|---|---|---|---|---|
| 5,117,593 | A | * | 6/1992 | Tiernan ............... E04H 7/24 |
| | | | | 52/169.6 |
| 5,720,363 | A | * | 2/1998 | Kipp ............... B61B 13/10 |
| | | | | 186/55 |
| 6,036,559 | A | * | 3/2000 | Arnold ............... A01K 87/00 |
| | | | | 441/6 |
| 6,340,269 | B1 | | 1/2002 | Stanton et al. |
| 7,448,404 | B2 | | 11/2008 | Samuelsen et al. |
| 9,316,013 | B1 | * | 4/2016 | Kraft ............... E02D 29/045 |
| 9,464,451 | B1 | | 10/2016 | Skaw |
| 9,505,559 | B1 | * | 11/2016 | Cai ............... B65G 47/50 |
| 9,511,959 | B2 | | 12/2016 | Bambrogan et al. |
| 2005/0145631 | A1 | * | 7/2005 | Flynn ............... H02G 9/10 |
| | | | | 220/484 |
| 2010/0183407 | A1 | * | 7/2010 | Kim ............... B65G 63/004 |
| | | | | 414/139.4 |
| 2012/0143726 | A1 | | 6/2012 | Chirnomas |
| 2012/0312215 | A1 | * | 12/2012 | Lyons ............... B63C 7/10 |
| | | | | 114/54 |
| 2014/0091574 | A1 | | 4/2014 | Favy |
| 2016/0364989 | A1 | | 12/2016 | Speasl et al. |

\* cited by examiner

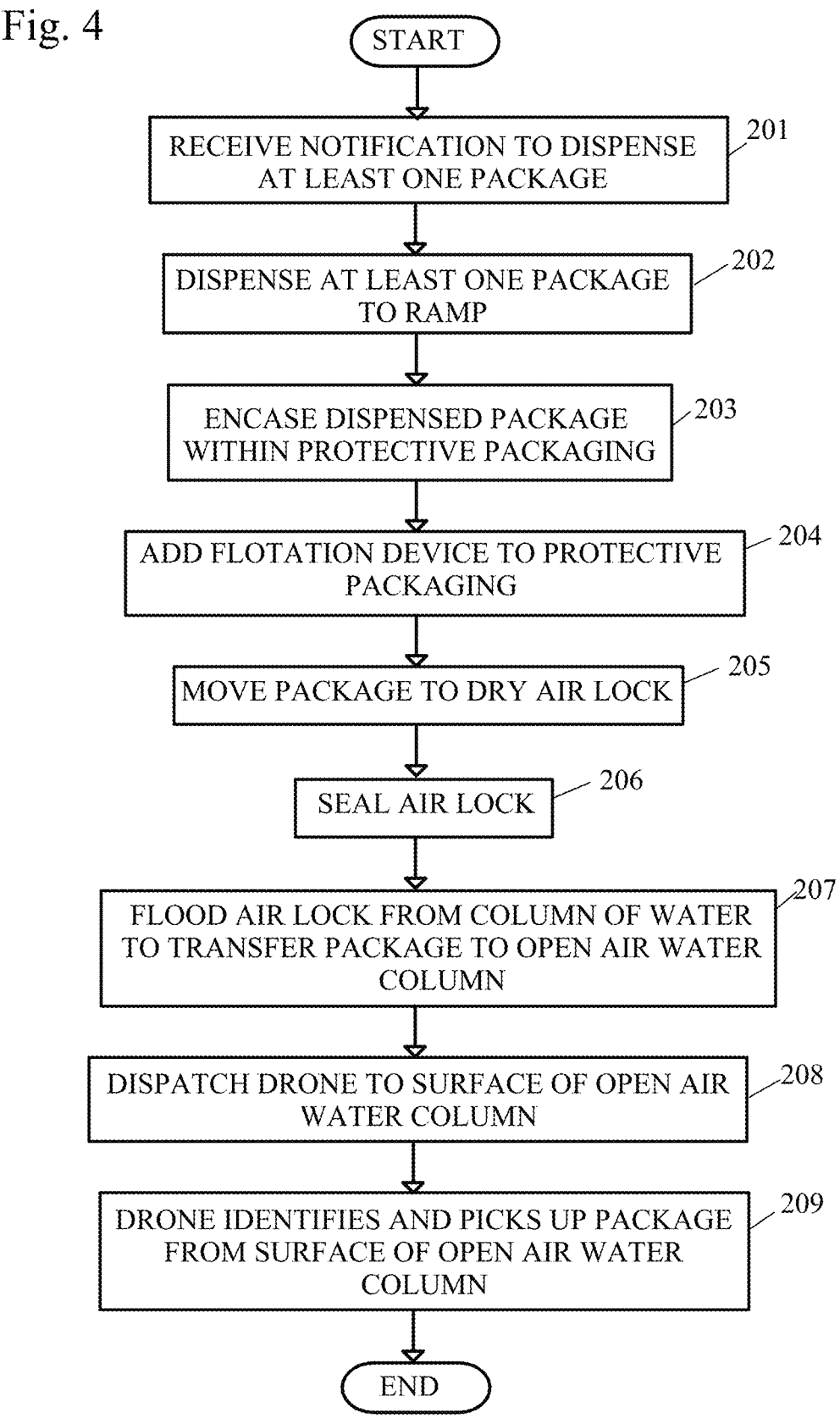

UNDERGROUND STORAGE SYSTEM WITH GRAVITATIONAL AND BUOYANCY FORCE-BASED PACKAGE DELIVERY

BACKGROUND

The present invention relates to package handling systems, and more specifically to systems for handling packages using gravity and buoyancy.

Underground storage systems are known and in current production today. These systems have many advantages over the various aboveground storage systems. It is possible to have both underground and aboveground storage systems working together, thus creating a hybrid type of approach that allows for users to benefit from both systems simultaneously.

In any underground storage system, or in a large vending machine, the packages are stored in product shelves. If any package present in the shelves needs to be delivered to a user at ground level, the system must have a mechanism to lift the package from the bottom of the system. It would be beneficial for an underground storage system to use different types of energy, rather than traditional systems.

Additionally, as drone deliveries become commonplace, it would be beneficial to have a way to facilitate a complete end-to-end system of both aboveground and underground storage, through pick up by a drone, and quick delivery.

SUMMARY

According to one embodiment of the present invention, an underground storage system is disclosed. The underground storage system comprising: a storage facility and at least one open air fluid column. The storage facility comprising an above ground portion connected to a hollow underground portion having a bottom; a helical ramp extending from the above ground portion, through the underground portion to the bottom of the storage facility; a plurality of package dispensaries adjacent the helical ramp to dispense packages to the helical ramp; a first conveyor at the bottom of the underground portion connected to the helical ramp to receive packages from the helical ramp; and an airlock adjacent the bottom of the underground portion connected to the first conveyor. The open air fluid column having a fluid surface open to the open air, the at least one open air fluid column being adjacent and connected to the underground portion of the storage facility through the airlock.

According to another embodiment of the present invention, an underground storage system is disclosed. The underground storage system comprising: a storage facility comprising: an aboveground portion connected to a hollow underground portion having a bottom, the underground portion filled with a fluid; a first conveyor in the aboveground portion receiving packages and transporting packages to the underground portion, the packages being wrapped in a protective covering, receiving a floatation device and a compressor and a detachable ballast; at least one open air fluid column having a surface open to the open air, the at least one open air fluid column being connected to the underground portion of the storage facility; a package dispensed to the first conveyor wraps the package in a protective covering, attaches at least one floatation device, a compressor and a detachable ballast and transports the package to the bottom of the underground portion through the fluid. When a package is to be dispensed to an end user, the compressor is activated, inflating the floatation device, such that the floatation device initiates travel of the package from the bottom of the underground portion of the storage facility to the open air surface of the open air fluid column.

According to another embodiment of the present invention, a method of dispensing packages from a storage facility is disclosed. The method comprising the steps of: a computer receiving instructions to dispense at least one package to a helical ramp of an underground portion of a storage facility extending to a bottom of the storage facility; the computer dispensing the at least one package to the helical ramp from at least one package dispensary; the computer encasing the dispensed package within protective packaging at the bottom of the storage facility; the computer adding at least one floatation device to the dispensed package within the protective packaging; the computer transporting the dispensed package within the protective packaging and the at least one flotation device to an airlock; the computer sealing the airlock; the computer flooding the airlock from a column of fluid adjacent to the underground portion of the storage facility to transfer the dispensed package to the column of fluid, such that the flotation device moves the dispensed package to an open air surface of the column of fluid; the computer dispatching a drone to the open air surface of the column of fluid to pick up the package.

BRIEF DESCRIPTION OF THE DRAWINGS

FIG. 4 shows a flow diagram of a method of dispensing packages within an underground storage facility.

DETAILED DESCRIPTION

Figure 1:
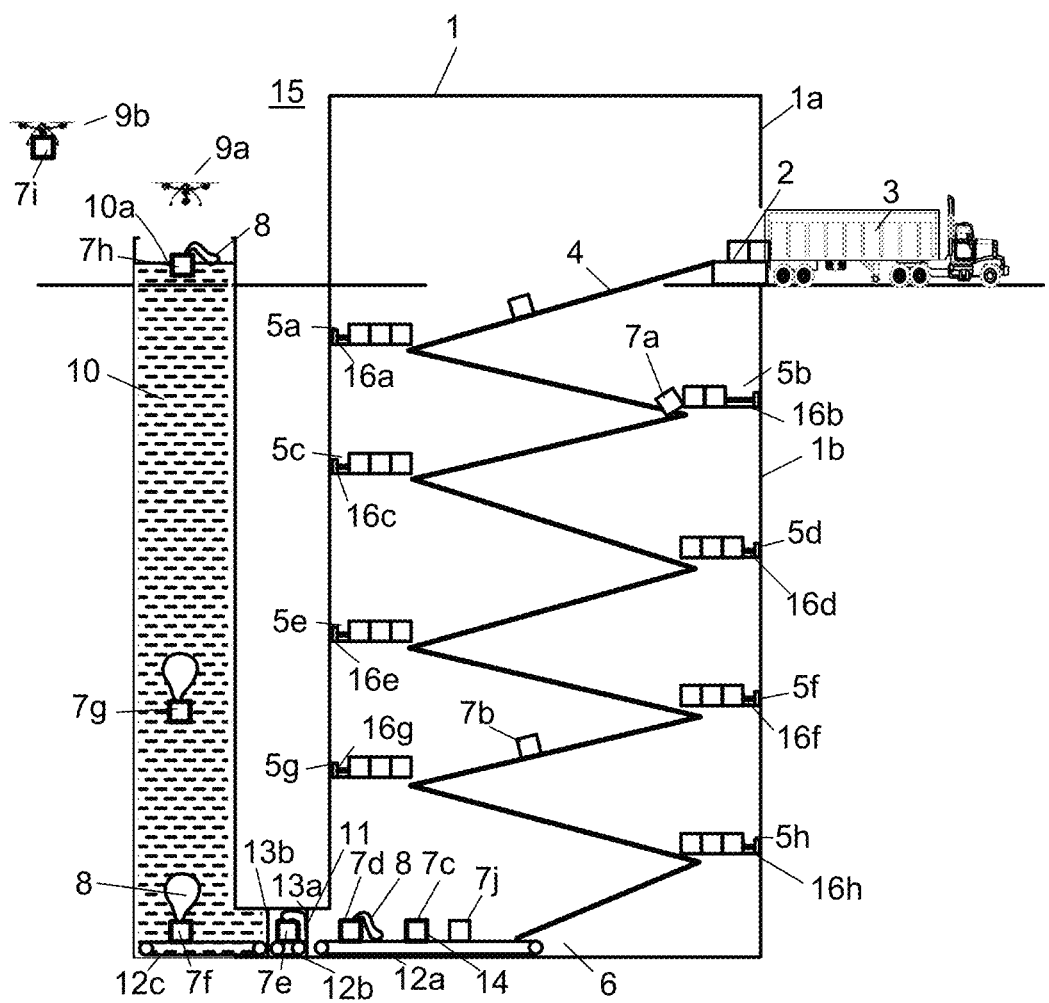
FIG. 1 shows a schematic of a systems for handling packages using gravity and buoyancy within an underground storage facility of a first embodiment.

FIG. 1 shows a schematic of a system for handling packages using gravity and buoyancy within an underground storage facility of a first embodiment.

It should be noted that package 7a-7j shows different stages of the same package as the package is dispensed through the system.

The storage facility 1 has an aboveground entrance 1a leading to an underground portion 1b. The underground portion 1b is hollow and preferably contains a helical ramp or channel 4 which can extend from the aboveground entrance 1a to the bottom of the underground portion 1b, a series of package dispensaries 5a-5h for dispensing packages 7a to the helical ramp 4, and a packaging area 6 for applying a protective wrapping 14 around a dispensed package 7j at the bottom of the underground portion 1b.

The packaging area 6 of the underground portion 1b is connected to an airlock 11 with a packaging area door 13a and a fluid column door 13b. Adjacent the fluid column door 13b of the airlock 11 is an open air fluid filled column 10, with a surface 10a exposed to the open air 15. The open air may be outdoors or exposed to air which is not underground. The level of the surface 10a of the open air fluid column 10 may vary relative to the storage facility and may be may be aboveground 1a or underground 1b. Multiple open air fluid columns may be present around the storage facility and connected to the underground portion 1b through a plurality of airlocks 11.

A truck 3 may provide packages at a loading dock 2 present at the aboveground entrance 1a to supply the stores of packages present in the underground portion 1b or to be dispensed to the helical ramp 4. The truck may be connected to an inclined ropeway mechanism which can be used for loading the underground package dispensaries 5a-5h. The packages on the inclined ropeway may travel to the underground package dispensaries 5a-5h via gravitational force or some other means.

Packages 7a may be dispensed to the helical ramp 4 from package dispensaries 5a-5h along the helical ramp 4. The packages may be dispensed to the helical ramp 4 by pusher actuators 16a-16h or any other means. The pusher actuators 16a-16h may be controlled by a computer system or may be manually activated. The helical ramp 4 is shaped such that the packages 7b can slide to the bottom by gravity.

The bottom of the helical ramp 4 dispenses packages 7b onto a first conveyor belt 12a in the packaging area 6. Packages 7j on the first conveyor belt 12a are encased in a protective covering 14. The protective covering 14 may be made of any material that prevents water from entering the package and is preferably air tight. In one embodiment, the protective covering additionally includes an integral radio-frequency identification (RFID) tag that includes information which can provide identifying information for the package. The RFID tag may be active or passive.

After the package 7c is encased in the protective covering 14, a floatation device 8 is added. An example of floatation device 8 is at least one balloon. Other devices which facilitate floatation of the package up through the open air fluid column 10 may be used within the scope of the invention. The number of floatation devices may vary depending on the weight of the package.

Once the floatation device is added to the package 7d, the package 7d is transferred to the airlock 11 and a second conveyor belt 12b through the packaging area door 13a. The airlock 11 is present between the packaging area door 13a and the fluid column door 13b. Once the package area door 13a is closed, the fluid column door 13b is opened, allowing fluid from the open air fluid column 10 to enter the airlock 11. The floatation device is preferably inflated using a mix of gases or chemicals. The fluid transfers the package 7e to the third conveyor belt 12c within the open air fluid column 10 and the floating device 8 begins to move the package 7f from the third conveyor belt 12c such that the package 7g travels up through the open air fluid column 10 to the surface 10a.

When the package 7h is at the surface 10a of the open air fluid column 10, a drone 9a can identify and pick up the package 7h and deliver the package 7i to a destination. The drone 9a may use the RFID tags to obtain information necessary for identification of the package 7h on the surface 10a of the open air fluid column 10 and delivery of the package 7i by the drone 9b.

The airlock 11 may include a hydraulic system to drain or remove the fluid from the airlock 11 after the fluid column door 13b has been opened and then closed after releasing the package 7e. This resets the airlock 11 to receive another package from the packaging area door 13a.

While not shown, a computer system may be present to control the dispensing and movement of the package from the underground storage facility to the open air fluid column for pick-up by the drone, such as dispensing of the packages to the helical ramp, conveyor belt movement and opening/closing of the doors associated with the airlock. The computer system can also control automated machinery used to add the protective covering and the floatation device to the package being dispensed. In another embodiment, some of the movement can be automated and controlled by the computer system and some of the movement or addition of the protective covering and floatation device can be done manually by a user.

Referring to FIGS. 1 and 4, pushing actuators 16a-16h of at least one package dispensary 5a-5h along the helical ramp 4 receive instructions to dispense at least one package onto the helical ramp 4 from a computer of a computer system (step 201). The computer system comprises at least one computer and can communicate and control processors or computers present within equipment within the underground storage facility.

The pushing actuator 16a-16h dispenses or pushes at least one package 7a onto the helical ramp 4 (step 202). The package 7b travels down the helical ramp 4 via gravity to the packaging area 6 where the package 7j is deposited onto the first conveyor 12a.

Once the package 7j reaches the packaging area 6 at the end of the helical ramp 4, the package 7c is encased in protective packaging 14 (step 203), for example via automated machinery or manually by a user. The package 7d then receives a floatation device 8 (step 204). The floatation device may be manually attached by a user or attached via automated machinery receiving instructions from a computer. It should be noted that step 103 and 104 could be combined into a single step. As previously discussed above, the protective packaging 14 preferably includes an identifier, such as a RFID tag which can identify the package to a drone or other device or user which will be delivering the package to an end user.

The package 7e is then moved to the airlock or switch gate 11 (step 205) via the second conveyor 12b through the packaging air lock door 13a, for example by the computer system.

The airlock is sealed (step 206) by closing the packaging air lock door 13a, for example by the computer system.

The airlock is then unsealed (step 207), for example by the computer system, by opening the fluid column door 13b to flood the airlock 11 with fluid from the open air fluid column 10. The fluid from the open air fluid column 10 aids in moving the package 7f with the floatation device 8 to begin movement of the package 7g up through the open air fluid column 10.

Once the package 7h is present at the surface 10a of the open air fluid column 10, a drone 9a may be dispatched to the surface 10a (step 208) and the package 7i is retrieved and preferably carried away by a drone 9b to an end user (step 209) and the method ends. It should be noted that the RFID tag may include information that the drone or a user can uses to identify the destination of the package for an end user.

Figure 2:
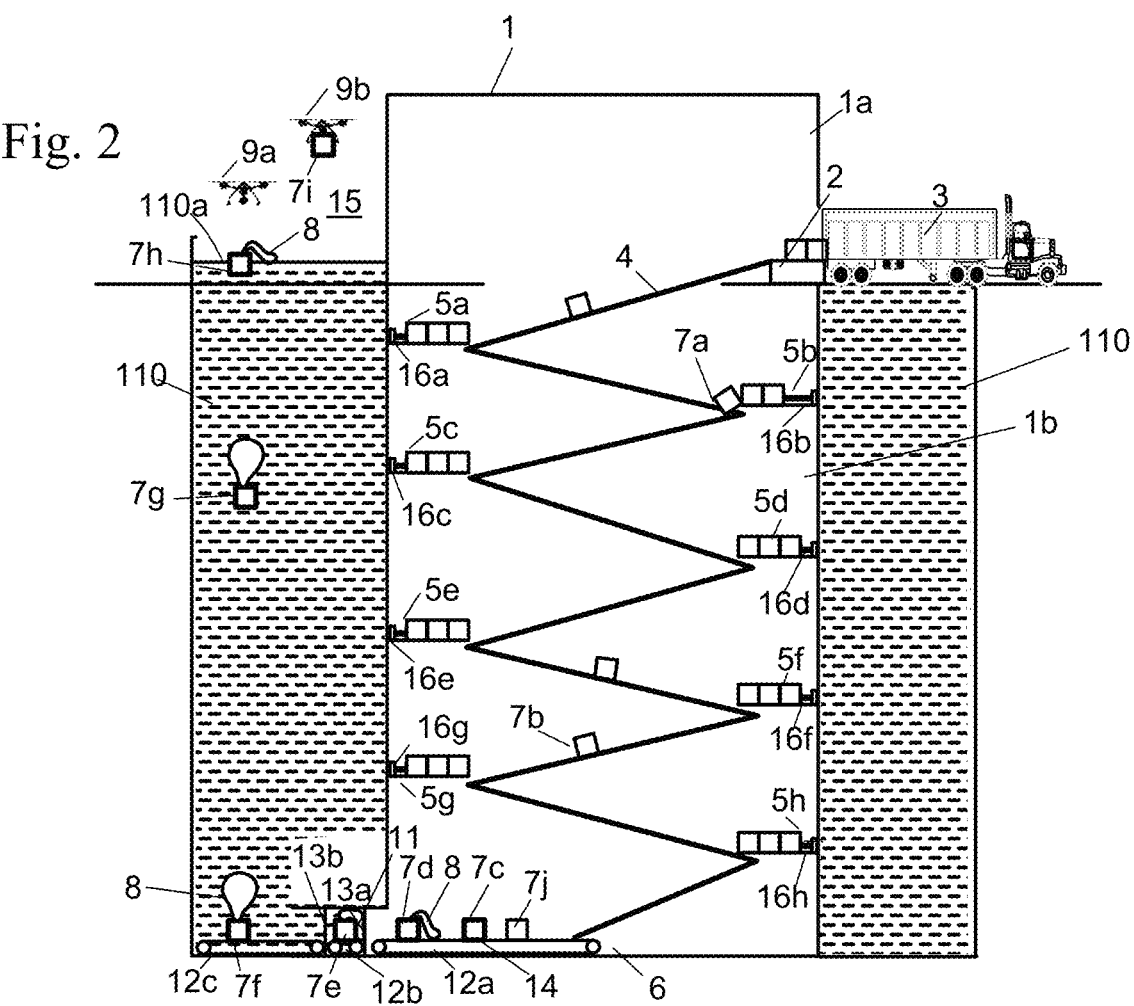
FIG. 2 shows a schematic of a system for handling packages using gravity and buoyancy within an underground storage facility of a second embodiment.

FIG. 2 shows an alternate configuration in which there is a single open air fluid column 110 with a surface 110a which surrounds the entire underground portion 1b of the storage facility 1. While only one airlock 11 is shown, multiple airlocks 11 to the single open air fluid column 110 may be present. The movement of the package is the same as discussed above relative to FIGS. 1 and 4.

In the above embodiments, buoyancy is used to transfer a package from an underground storage area to a surface in which the package can be picked up for delivery to an end user. Power is preferably not required to elevate packages from the bottom of the storage facility to the surface in which the package can be picked up.

Figure 3:
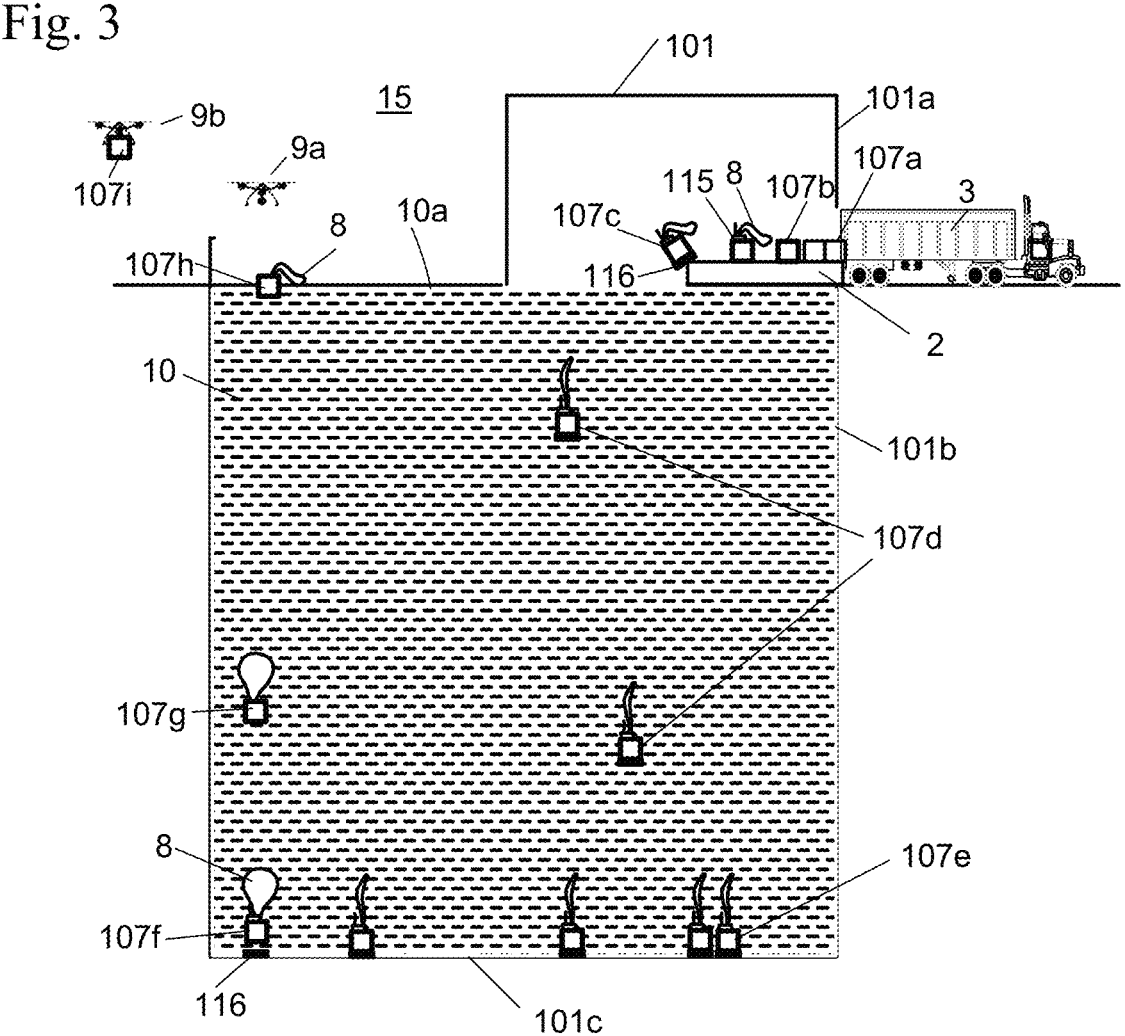
FIG. 3 shows a schematic of a system for handling packages using gravity and buoyancy within an underground storage facility of a third embodiment.

FIG. 3 shows another embodiment of a schematic of a systems for handling packages using gravity and buoyancy within an underground storage facility.

It should be noted that package 107*a*-107*i* shows different stages of the same package as the package is dispensed through the system.

The storage facility 101 has an aboveground entrance 101*a* leading to an underground portion 101*b*. The underground portion 101*b* is hollow and preferably contains fluid 10. A truck 3 may provide packages at a loading dock 2 present at the aboveground entrance 101*a*. The packages 107*a* are provided by the truck 3. The packages 107*b* are encased in a protective covering 14. The protective covering 14 may be made of any material that prevents water from entering the package and may be air tight. In one embodiment, the protective covering additionally includes an integral radio-frequency identification (RFID) tag that includes information which can provide identifying information for the package. The RFID tag may be active or passive. In another embodiment, the RFID tag is part of the compressor 115 which is attached to the protective covering of the package.

After the package 7*c* is encased in the protective covering 14, a floatation device 8 and a compressor 115 are added. An example of floatation device 8 is at least one balloon. Other devices which facilitate floatation of the package up through the open air fluid column 10 may be used within the scope of the invention. The compressor 115 is preferably an air compressor.

A ballast 116 is then attached to the bottom of the package 107*c* to aid the package in reaching the bottom 101*c* of the underground storage facility 101. After the ballast 116*a* is attached, the package 107*c* is dispensed to the fluid in the underground portion 101*b* of the storage facility 101.

As the package 107*d* sinks to the bottom 101*c* of the underground portion 101*b* of the storage facility 101, the floatation device 8 is not activated.

Once package 107*e* reaches the bottom 101*c* of the underground portion 101*b* of the storage facility 101, the packages may be moved to a position to align with the open air surface 10*a* of the fluid 10 using an underwater propeller system or other means. The propeller system may be incorporated into the ballast of the package.

The compressor 115 of the package 107*f* may be remotely activated and the ballast detached to allow the package 107*g* to float to the surface 10*a*.

When the package 7*h* is at the surface 10*a* of the open air fluid column 10, a drone 9*a* can identify and pick up the package 7*h* and deliver the package 7*i* to a destination. The drone 9*a* may use the RFID tags to obtain information necessary for identification of the package 7*h* on the surface 10*a* of the open air fluid column 10 and delivery of the package 7*i* by the drone 9*b*.

While a single package is depicted in FIGS. 1-3, each single package may contain multiple packages within the protective wrapping 14 and the floatation device 8 may be adjusted to accommodate for multiple packages.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An underground storage system comprising:
a storage facility comprising:
an above ground portion connected to a hollow underground portion having a bottom;
a helical ramp extending from the above ground portion, through the underground portion to the bottom of the storage facility;
a plurality of package dispensaries adjacent the helical ramp to dispense packages to the helical ramp;
a first conveyor at the bottom of the underground portion connected to the helical ramp to receive packages from the helical ramp; and
an airlock adjacent the bottom of the underground portion connected to the first conveyor;
at least one open air fluid column having a fluid surface open to the open air, the at least one open air fluid column being adjacent and connected to the underground portion of the storage facility through the airlock.

2. The system of claim 1, wherein the packages on the helical ramp slide to the bottom via gravitational force.

3. The system of claim 1, wherein the fluid of the open air fluid column is water.

4. The system of claim 1, wherein a single open air fluid column surrounds at least the entire outer circumference of the underground portion of the storage facility.

5. The system of claim 1, wherein a package dispensed to the helical ramp from the package dispensary travels down the helical ramp to the first conveyor at the bottom of the underground portion, to the airlock along the first conveyor, from the airlock to the open air fluid column and through the open air fluid column and as the package travels on the first conveyor to the air lock, the package is wrapped in a protective packaging and at least one floatation device is attached.

6. The system of claim 5, wherein the protective package further comprises a RFID tag and is waterproof.

7. The system of claim 5, wherein a drone picks up the package at the surface of the open air column.

8. The system of claim 7, wherein the drone queries a RFID tag within the protective packaging of the package to identify the package for pick and deliver to an end user.

9. A method of dispensing packages from a storage facility comprising the steps of:
a computer receiving instructions to dispense at least one package to a helical ramp of an underground portion of a storage facility extending to a bottom of the storage facility;
the computer dispensing the at least one package to the helical ramp from at least one package dispensary, the at least one dispensed package being encased within protective packaging and having at least one attached flotation device;
the computer transporting the dispensed package within the protective packaging and the at least one attached flotation device to an airlock;
the computer sealing the airlock;
the computer flooding the airlock from a column of fluid adjacent to the underground portion of the storage facility to transfer the dispensed package to the column of fluid, such that the flotation device moves the dispensed package to an open air surface of the column of fluid;
the computer dispatching a drone to the open air surface of the column of fluid to pick up the package.

10. The method of claim 9, further comprising the steps of delivering the package to an end user by the drone.

11. The method of claim 9, wherein the packages on the helical ramp slide to the bottom via gravitational force.

12. The method of claim 9, wherein the fluid of the open air fluid column is water.

13. The method of claim 9, wherein a single open air fluid column surrounds at least the entire outer circumference of the underground portion of the storage facility.

14. The method of claim 9, wherein the protective package further comprises a RFID tag and wherein the package is waterproof.

15. The method of claim 14, wherein the drone queries the RFID tag within the protective packaging of the package to identify the package for pick-up and delivery to an end user.

16. An underground storage system comprising:
a storage facility comprising:

an aboveground portion connected to a hollow underground portion having a bottom, the underground portion filled with a fluid;

a first conveyor in the aboveground portion receiving packages and transporting packages to the underground portion, each of the packages being wrapped in a protective covering and including an attached floatation device, an attached compressor and a detachable ballast;

at least one open air fluid column having a surface open to the open air, the at least one open air fluid column being connected to the underground portion of the storage facility, such that each of the packages is transported to the bottom of the underground portion through the fluid;

when a package is to be dispensed to an end user, the compressor attached to the package to be dispensed is activated, inflating the floatation device attached to the package to be dispensed, such that the floatation device initiates travel of the package to be dispensed from the bottom of the underground portion of the storage facility to the open air surface of the open air fluid column.

17. The system of claim 16, wherein the compressor further comprises an RFID tag.

18. The system of claim 16, wherein a drone picks up the package at the surface of the open air column.

19. The system of claim 16, wherein when the compressor is activated and the floatation device is inflated, the ballast is detached.

20. The system of claim 19, wherein the drone queries a RFID tag to identify the package for pick and deliver to an end user.

* * * * *